(No Model.) 2 Sheets—Sheet 1.
H. W. MARTIN.
FISHING REEL.
No. 594,412. Patented Nov. 30, 1897.
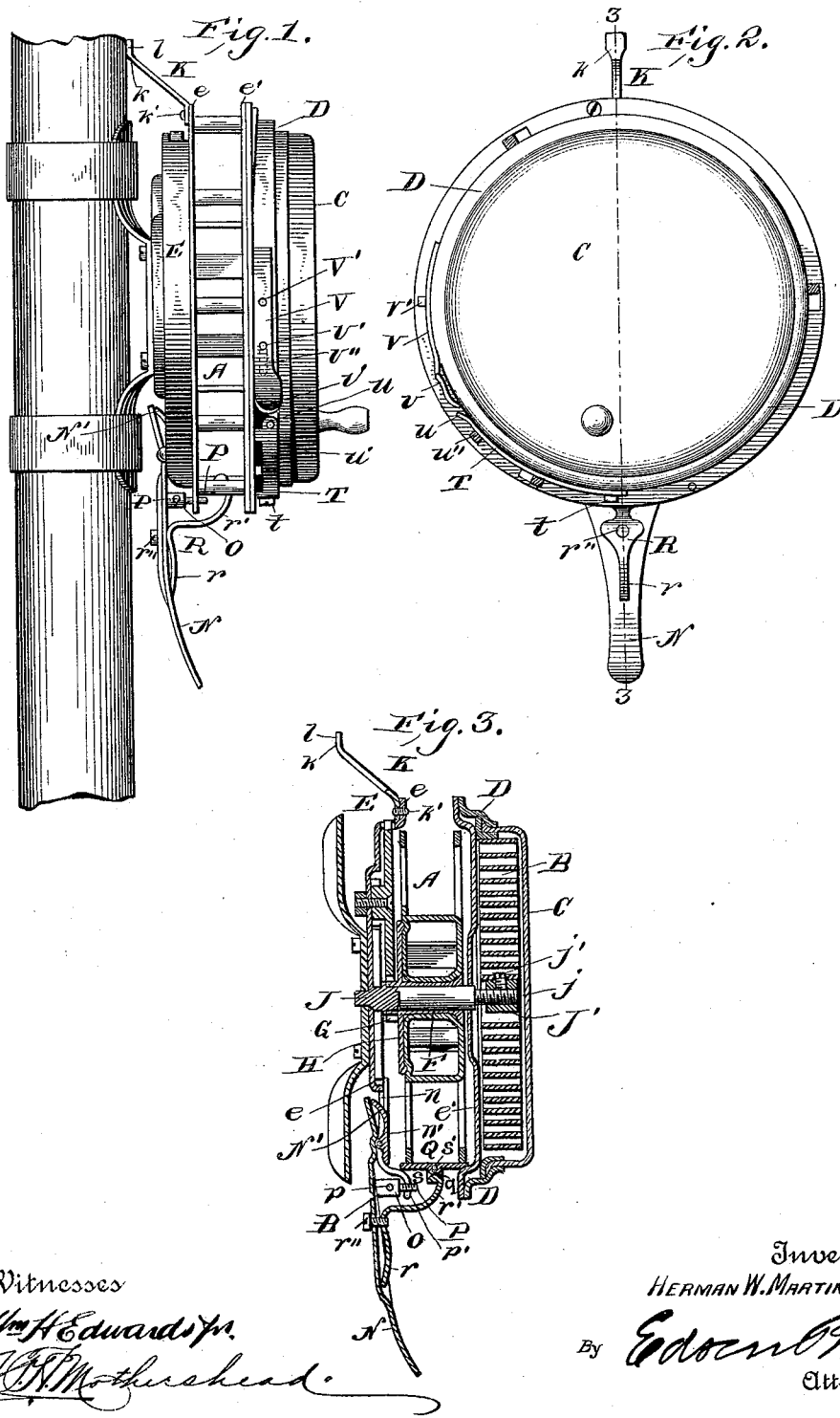
Witnesses
Wm H Edwards Jr.
J. R. Mothershead.
Inventor
HERMAN W. MARTIN
By Edson Bros.
Attorneys (No Model.) 2 Sheets—Sheet 2.
H. W. MARTIN.
FISHING REEL.
No. 594,412. Patented Nov. 30, 1897.
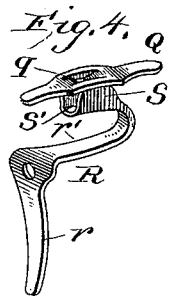
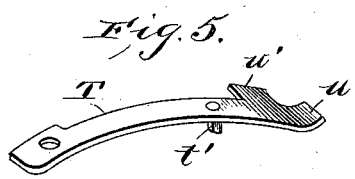
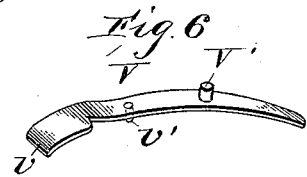
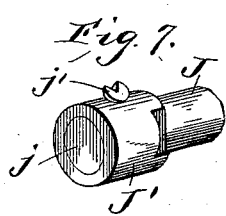
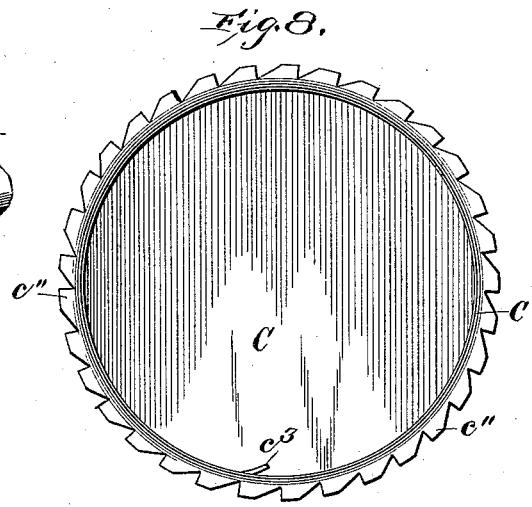
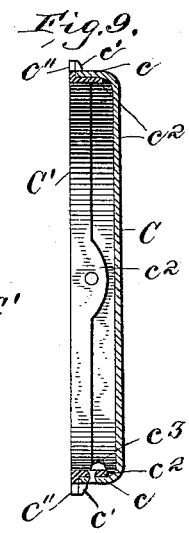
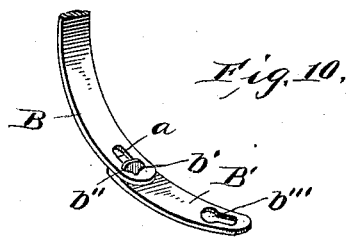
Witnesses
Wm H. Edwards Jr.
J. N. Mothershead
Inventor
Herman W. Martin
By Edson Bros,
Attorneys.
THE NORRIS PETERS CO., PHOTO-LITHO., WASHINGTON, D. C.

UNITED STATES PATENT OFFICE.

HERMAN W. MARTIN, OF ILION, NEW YORK.

FISHING-REEL.

SPECIFICATION forming part of Letters Patent No. 594,412, dated November 30, 1897.

Application filed September 20, 1897. Serial No. 652,295. (No model.)

*To all whom it may concern:*

Be it known that I, HERMAN W. MARTIN, a citizen of the United States, residing at Ilion, in the county of Herkimer and State of New York, have invented certain new and useful Improvements in Fishing-Reels; and I do hereby declare the following to be a full, clear, and exact description of the invention, such as will enable others skilled in the art to which it appertains to make and use the same.

My present invention is designed as an improvement on the fishing-reels patented to me on the 17th day of December, 1895, by United States Letters Patent No. 551,550; and the objects that I have in view are, first, to provide an improved style of brake which secures a light friction-pressure coming in contact with the line-spool to permit the line to be easily drawn from the line-spool without releasing the brake-lever; secondly, to provide means for easily releasing the spring-detent from the ratchet of the spring-drum in order to permit the drum turning freely in a backward direction for the purpose of having the line run freely from the spool, thereby making a perfect bait-casting reel; thirdly, in a novel connection between the end of the line-spool arbor or post and the mainspring, which is so held that it cannot bear forcibly against the bushing of the center plate or housing of the reel; fourth, in the arrangement of parts which prevents the line from catching or becoming entangled between the reel and pole or from being drawn under the reel; fifth, in a reinforcement for the drum, which strengthens the same and affords a convenient means for the attachment of the mainspring, and, finally, it consists in an improved connection for the outer end of the mainspring to the mainspring-drum, which connection admits of the mainspring drawing in a coil to the center when wound up and obviates breaking of the end of the mainspring where it is attached to the drum and prevents the mainspring from being uncoupled from the drum.

With these ends in view my invention consists in the novel construction and combination of devices and in the construction and arrangement of parts, which will be hereinafter fully described and claimed.

The accompanying drawings illustrate an improved fishing-reel embodying my improvements, in which—

Figure 1 is an elevation showing the reel applied to a fishing-pole, the view looking at the edge of the reel. Fig. 2 is an elevation looking at the side of the reel containing the mainspring-drum. Fig. 3 is an axial sectional view taken through the reel in the direction of the line-spool shaft or arbor, the plane of the section being indicated by the dotted line 3 3 on Fig. 2. Fig. 4 is a detail perspective view of the new form of spring-brake, showing the curved auxiliary spring and the plate-like shoe which is adapted to ride upon the periphery of the line-spool in a manner to avoid wear on the bearings of the center post, or the spindle, or the arbor of the line-spool. Figs. 5 and 6 are detail views, respectively, of the spring-detent for the ratchet of the mainspring-drum and the slidable release-bar which is adapted to throw the spring-detent from engagement with the ratchet of the mainspring-drum. Fig. 7 is a detail view of the boss on the arbor or post of the line-spool, to which boss the inner end of the mainspring is fastened. Figs. 8 and 9 are views in elevation and transverse section, respectively, of the mainspring-drum. Fig. 10 is a detail view showing the compensating link and a portion of the mainspring, whereby the spring may be connected to the rotatable drum without liability of the spring breaking or becoming uncoupled.

Like letters of reference denote corresponding parts in all the figures of the drawings, referring to which—

A is the line-spool. B is the mainspring; C, the rotatable drum, which incloses the mainspring. D is an annular clamp to confine the rotatable drum on one side of the reel, and E is the reel casing or housing. These devices are all constructed substantially as shown and described in my prior patent, No. 551,550, and detailed description thereof in this specification is not thought to be necessary.

The line-spool A has the bushing F, the pinion G, and the friction-clutch H, as in my former patented reel, and through the pinion and the bushing passes the center post, arbor or spindle J, one end of the post or spindle J being extended through the disk e' of the reel-casing E for the attachment of the mainspring B thereto. Said extended end of the spindle or post is externally screw-threaded, as at j, and on it is screwed an internally-threaded boss J', which is securely held in position by means of the check-screw j', which is screwed into a threaded hole tapped in the boss at right angles to the axis thereof, said screw having its point arranged to bear upon the threaded end j of the post or spindle. This construction prevents the boss from screwing down against the bushing of the plate e' of the reel casing or housing, and it provides a simple means for the secure attachment of the inner end of the mainspring B to the spindle or arbor of the line-spool.

In my improved reel I have incorporated a novel form of two spring adjustable brake devices, which in the embodiment shown in the drawings presents several valuable features. In this new form of brake the brake-lever carries a spring of peculiar form, to which spring is attached a brake plate or shoe that rides upon the periphery and not on the face of the line-spool, the brake-lever being controlled by a spring separate from or independent of the spring that carries the brake plate or shoe, the brake being furthermore controlled by an adjustable stop device, which regulates the pressure or braking-power of the lever and the spring thereof.

The brake-lever is indicated at N in the drawings, and it is applied to the plate e of the reel casing or housing E in substantially the same way as in my former patented reel—that is to say, a slot or opening n is produced in the plate e, the brake-lever N is fulcrumed at n' on the disk e in a way to have the short arm of said lever lie over the slot, and a primary pressure-spring N' is secured within the reel-casing or the plate e thereof in a manner to press against the short arm of the brake-lever. Said spring N' tends to throw the brake-lever to a position where the long arm thereof lies over the reel, but in my new brake device the tendency of the brake to move over the reel is limited by means of the adjustable stop O. In the preferred embodiment of this stop it consists of a screw-threaded shank P and the enlarged head P', the latter having two or more apertures or sockets p, into which may be fitted a pin or other device for turning the shank P. The flanged rim of the plate or disk e is provided with a threaded opening p' at a point opposite to the brake-lever, and in this opening is screwed the threaded shank P of the adjustable stop, which is so arranged that the head P' lies between the flanged rim of the plate E and the brake-lever, whereby the head P' is made to lie in the path of the brake-lever and to limit the play of the brake-lever in the direction in which it is pressed or held by the spring N'. It will be seen that the stop O may be adjusted to hold the long arm of the brake-lever farther away from the plate e, and thus throw the short arm of the brake-lever inwardly to increase the pressure of the spring on the brake-lever, or said stop may be adjusted in the reverse direction to lessen the spring-pressure on the brake-lever. The brake-shoe Q of the brake consists of a substantially flat plate R, which is fitted or arranged transversely across the line-spool, so that its end portions will bear or press against the peripheral edges of the line-spool, and this plate is struck up at its middle portion to form the lug q. Said plate-shoe Q is carried by the spring R, which in turn is attached to the brake-lever, so as to move therewith. This spring is bent at one end to form the arm r and at its other end it is curved into the foot r', the general shape of the spring being such that it may be termed a "gooseneck" spring. This spring is connected to the brake-lever at a point where the arm r branches therefrom by a screw or other fastening r'', so that the arm r will press against the brake-lever, and the curved foot r' is shaped to form the lugs s, between which the lug q of the plate-shoe is fitted, the parts being pivotally attached by the pin s'. The auxiliary spring R secures a light pressure and frictional contact on the line-spool, which admits of the line being withdrawn from the line-spool without releasing or pressing against the lever. This auxiliary spring R is not of sufficient strength nor is it applied in a manner to hold the brake-lever in place. Hence the mainspring N' is made stiff or strong enough to resist any slight touch on the brake-lever and prevent it from releasing the line-spool at a time when it is not desired to draw the line. The friction-plate shoe having peripheral contact with the line-spool has adjustable or yielding qualities, so that no cramp or undue pressure is brought on the line-spool to wear the bearings on the arbor or spindle J. Another advantage of the spring R having the peculiar form shown and arranged to pass over the plate e of the reel-casing to attach the spring to the brake-lever is that the spring serves as a guard to prevent the line when slack from drawing underneath the plate e, whereby the line is prevented from being caught and entangled around the saddle-plate I when the finger is pressing against the brake-lever in manipulating the reel.

The drum C has the lateral flange c, on the inner edge of which is produced the ratchet-teeth c'. In my improved reel I make this drum of aluminium for lightness and durability; but as the drum is made of quite thin metal I provide the reinforcement C' of brass, steel, or other strong metal. This reinforcement C' is of angular shape in cross-section and of annular form, so that it is adapted to fit within the drum and bear against the inner edge thereof. The offstanding flange of the angular reinforcement has ratchet-teeth c'', which register with the teeth c' of the drum C, and the part of the reinforcement within the drum is formed with the ears $c^2$ and with the struck-up lip $c^3$, said ears $c^2$ serving as the means for the attachment of the rivets or pins which fasten the drum and reinforcement together and the lip $c^3$ forming a convenient and strong mode of attaching the drum and spring B to each other.

I have provided an improved means for connecting the outer end of the mainspring to the rotatable drum C. When the outer end of the mainspring is attached directly to the drum, as in my prior patent, the spring is liable to be broken or become detached at the place where it is attached to the drum, owing to its rapid uncoiling and the severe strain exerted thereon; but the compensating link connection shown by Fig. 10 of the drawings obviates the objections. The outer end of the mainspring is provided with an oblong slot $a$, the greatest diameter of which is in the direction of the strip or length of metal, which is coiled spirally to produce the spring. The link B' is provided between the slotted end $a$ of the spring and the hook-shaped lip $c^3$ of the drum, so as to form a compensating connection which permits the spring to contract radially when it is put under tension by rotating the drum in the proper direction and which link is so connected to the drum and to the spring that the latter will not be broken or become uncoupled when it is released and is suddenly expanded. The end of the link B', which connects to the slotted end $a$ of the spring C, is provided with a stud or pin $b$, having a head $b''$, which stands across the length of the link B', the length of the head $b''$ being greater than the width of the slot $a$. In the opposite end of the link B' is formed a keyhole-slot $b'''$, the straight portion of which is between the enlarged portion or eye and the end of the link, as shown by Fig. 10. The link B' is attached to the end $a$ of the spring by turning the link at right angles to the spring and passing the head $b''$ of the stud $b'$ through the slot $a$, after which the link is turned into line with the spring, so that the head $b''$ lies across the slot $a$, whereby the link cannot be detached from the spring without turning the link around, which adjustment is not possible when the device is in use, owing to the narrow form of the drum and the length of the link. At the same time the link and spring are loosely attached together by the headed stud fitting in the slot, and the spring and link have a limited lateral movement which permits the spring to be wound up tightly without liability of breaking or disconnecting the outer end of the spring. The link B' is attached to the drum by passing the lip $c^3$ through the eye of enlarged end of the slot $b'''$ and allowing the tension of the spring to draw the link endwise, so as to pull the link to a position where the lip lies in the straight portion of the slot. In use the spring normally tends to draw on the link and holds it in a position where the lip $c^3$ lies in the straight portion of the slot, and the link B' is thus prevented from being detached from the lip of the drum.

The drum is held in place on the reel-casing by fitting the inner flanged and ratchet-formed edge within the annular clamp D, which is attached by screws or in any desired way to the plate $e'$, and on the outside of the clamp is fitted the spring-detent T, one end of which is fastened by the screw $t$ to the clamp D. This detent is provided with a spur or tooth $t'$, which passes through a slot or aperture in the clamp D, so as to engage with a ratchet-tooth on the drum, and the free end of the spring is turned up somewhat, as at $u$, and it also has a lateral or offstanding guide-lip $u'$, which plays and fits in a slot $u''$, formed in the vertical flange of the clamp D. With this detent T is combined means convenient for the operator's manipulation, which serve to throw the detent out of operative relation to or engagement with the ratchet of the drum. This consists of a slidable bar or plate V, fitted externally upon the periphery of the annular clamp D, one end of the bar being bent down to form a toe $v$, which is adapted to take or fit below the upturned end of the detent T. This slidable bar V has a holding-stud $v'$, which passes through and plays in a slot $v''$, formed in the clamp D, so as to hold the bar in slidable engagement with the clamp, and said slidable release-bar V is further provided with a projecting thumb-piece V', by which the operator can easily press the bar V into and out of engagement with the detent T. This construction enables the operator to easily throw the detent out of engagement with the ratchet-drum and release the spring and drum, so that the latter can turn backward freely. When the reel is in this condition, the line can run freely off the line-spool, making the reel well adapted for use as a bait-casting reel, but when the release-bar is pressed back out of engagement with the detent the latter springs back into place and the stud thereon engages with the ratchet of the drum, thereby making the reel an automatic or self-winding reel as soon as the drum is given a few turns to put the spring under tension.

I have also provided the reel with a guard K, which is arranged to prevent the line from drawing under the reel between the latter and the pole. It will be noted that the spring R for the brake-shoe is on one side of the reel to prevent the line from being entangled, and I have arranged the guard K on the opposite side of the reel for the same purpose. This guard consists of a bent bar or plate having a head $k$ at one end and pivotally attached to the plate $e$ of the reel, as at $k'$. This guard stands outwardly and laterally from the reel, and at its outer free end it has a curved bearing-face $l$, which is adapted to press against the butt of the fishing-pole when the reel is fastened thereto.

It is thought that the advantages of my improved construction will be readily understood and appreciated by those skilled in the art from the foregoing description, taken in connection with the drawings.

Having thus fully described my invention, what I claim as new, and desire to secure by Letters Patent, is—

1. In a fishing-reel, the combination with a line-spool, a casing or frame, and a spring brake-lever, of a brake-shoe arranged to ride upon the periphery of the line-spool, and a connection between said brake-shoe and the brake-lever whereby the brake-shoe is carried by the brake-lever and is movable in a plane toward or from the periphery of the line-spool, as and for the purposes described.

2. In a fishing-reel, the combination with a casing or frame, a line-spool, and a brake-lever, of a brake-shoe arranged to press against the line-spool, and a spring carried by the brake-lever and connected with the brake-shoe, as and for the purposes described.

3. In a fishing-reel, the combination with a frame or casing and a line-spool, of a spring brake-lever, a brake-shoe arranged to have peripheral contact with the line-spool, and a spring connection between the brake-shoe and the brake-lever, as and for the purposes described.

4. In a fishing-reel, the combination with a casing or frame and a line-spool, of a spring brake-lever, a brake-shoe to ride against the line-spool, and a spring which connects with the brake-shoe and brake-lever and which is arranged to fit over the reel-casing and serve as a guard to prevent the line from becoming entangled with the reel, substantially as and for the purposes described.

5. In a fishing-reel, the combination with a casing or frame, and a line-spool, of the spring-pressed brake-lever fulcrumed in the frame or casing, a transverse brake-shoe fitted to press against the peripheral edge of the line-spool, and a spring R which is attached to the brake-lever and pivotally connected to the brake-shoe, as and for the purposes described.

6. In a fishing-reel, the combination with a casing or frame, a mainspring-drum having a ratchet, and an externally-arranged detent attached to said casing or frame and having a projection engaging with said ratchet of the spring-drum, of a release device mounted externally on the casing or frame adjacent to the detent and movably held in position for adjustment into or out of engagement with said detent, as and for the purposes described.

7. In a fishing-reel, the combination with a ratchet spring-drum, a clamp therefor, and a detent to engage with the ratchet of the spring-drum, of a release-spring bar slidably connected to said clamp and having means for moving it into and out of engagement with said detent, as and for the purposes described.

8. In a fishing-reel, the combination with a reel-casing and a line-spool, of an arbor or spindle passing through a bushing of the line-spool and having a threaded end, a threaded boss screwed on the end of said arbor and held in place by a check device, and a spring connected to said boss, as set forth.

9. In a fishing-reel, a spring-drum provided with a ratchet and the angular reinforcement-band fitted in and secured to the flange of said drum, said reinforcement provided with a lip for attachment thereto of the mainspring, substantially as described.

10. In a fishing-reel, the combination with a mainspring, and a rotatable drum therefor, of a link connected to the outer end of said mainspring and to the drum so as to compensate for contraction or expansion of the spring without breaking the connection between said spring and drum, as and for the purposes described.

11. In a fishing-reel, the combination with a mainspring having a slot, $a$, at its outer end, and a drum provided with a lip or stud, of the link having a keyhole-slot for the reception of the lip or stud and carrying a headed stud or pin which fits in the slot of the spring, substantially as and for the purposes described.

12. In combination with a frame or housing, and a line-spool, the brake-lever fulcrumed on said housing, a primary spring bearing against said brake-lever, an adjustable stop device for said brake-lever, and a yieldable shoe carried by the brake-lever.

In testimony whereof I affix my signature in presence of two witnesses.

HERMAN W. MARTIN.

Witnesses:
CHAS. E. MAURICE,
R. A. SHEPARD.